(12) United States Patent
Nishiyama et al.

(10) Patent No.: US 8,790,566 B2
(45) Date of Patent: Jul. 29, 2014

(54) MANUFACTURING METHOD OF COMPOSITE MATERIAL MEMBER AND PREPREG SHEET LAMINATE

(75) Inventors: Shigeru Nishiyama, Aichi (JP); Shinichi Yoshida, Aichi (JP); Toshio Abe, Aichi (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 379 days.

(21) Appl. No.: 13/264,014

(22) PCT Filed: Jun. 1, 2009

(86) PCT No.: PCT/JP2009/059985
§ 371 (c)(1),
(2), (4) Date: Oct. 12, 2011

(87) PCT Pub. No.: WO2010/140205
PCT Pub. Date: Dec. 9, 2010

(65) Prior Publication Data
US 2012/0027989 A1 Feb. 2, 2012

(51) Int. Cl.
*B32B 5/12* (2006.01)
*B32B 3/28* (2006.01)
*B29C 53/04* (2006.01)

(52) U.S. Cl.
USPC ............................. 264/299; 264/239

(58) Field of Classification Search
CPC ............... B29C 70/202; B29C 70/342; B29K 2105/246; B29L 2031/003
USPC .................................. 264/299, 239
See application file for complete search history.

(56) References Cited

U.S. PATENT DOCUMENTS

| 5,114,654 A | 5/1992 | Hosoi |
| 5,173,314 A | 12/1992 | Hosoi |
| 6,114,012 A * | 9/2000 | Amaoka et al. ............... 428/182 |
| 2006/0048890 A1 | 3/2006 | Sato et al. |
| 2010/0227115 A1 | 9/2010 | Esaki et al. |

FOREIGN PATENT DOCUMENTS

| CN | 101356050 | 1/2009 |
| EP | 2 014 437 | 1/2009 |
| JP | 3-83624 | 4/1991 |
| JP | 3-83642 | 4/1991 |

(Continued)

OTHER PUBLICATIONS

Japanese Decision to Grant a Patent issued Dec. 18, 2012 in corresponding Japanese Patent Application No. 2008-017793 with English translation.

(Continued)

*Primary Examiner* — Brent O'Hern
(74) *Attorney, Agent, or Firm* — Wenderoth, Lind & Ponack, L.L.P.

(57) ABSTRACT

A manufacturing method of composite material member includes a step of shaping a laminate including laminated prepreg sheets along a mold. The laminate includes a first layer in which fibers are oriented in single direction. In the first layer, a first surface crossing the single direction and a second surface crossing the single direction are confronted each other such that the first surface and the second surface face each other. Since the fibers are discontinuous between the first surface and the second surface, the laminate is easily shaped and wrinkles are hard to be generated in a composite material member to be manufactured from the laminate.

5 Claims, 14 Drawing Sheets

(56) References Cited

FOREIGN PATENT DOCUMENTS

| | | | |
|---|---|---|---|
| JP | 8-276514 | 10/1996 | |
| JP | 08-276514 | 10/1996 | |
| JP | 08276514 A * | 10/1996 | ............. B29D 31/00 |
| JP | 10-258463 | 9/1998 | |
| JP | 10258463 A * | 9/1998 | ............. B29C 70/06 |
| JP | 2003-000780 | 1/2003 | |
| JP | 2006-69166 | 3/2006 | |
| JP | 3812960 | 8/2006 | |
| JP | 2007-253441 | 10/2007 | |
| JP | 2007-296767 | 11/2007 | |
| KR | 10-1998-0074508 | 11/1998 | |
| RU | 2 144 486 | 1/2000 | |
| WO | 2007/129619 | 11/2007 | |

OTHER PUBLICATIONS

Japanese Office Action issued Jan. 19, 2012 in corresponding Japanese Patent Application No. 2008-017793 with partial English translation.

Russian Decision of Granting a Patent issued Feb. 22, 2013 in corresponding Russian Patent Application No. 2011145333 with English translation.

Russian Office Action issued Sep. 13, 2012 in corresponding Russian Application No. 2011145333 with partial English translation.

Korean Notice of Allowance issued Oct. 29, 2013 in corresponding Korean Patent Application No. 10-2011-7026373 with partial English translation.

International Search Report issued Aug. 4, 2009 in International (PCT) Application No. PCT/JP2009/059985.

Taiwanese Approval Decision Letter issued Nov. 29, 2012 in corresponding Taiwanese Patent Application No. 098118850 with partial English translation.

Office Action issued Aug. 28, 2013 in corresponding Chinese Patent Application No. 200980158739.2, with English translation.

Canadian Decision to Grant a Patent issued Apr. 29, 2014 in corresponding Canadian Patent Application No. 2,760,968.

* cited by examiner

A-A

MANUFACTURING METHOD OF COMPOSITE MATERIAL MEMBER AND PREPREG SHEET LAMINATE

TECHNICAL FIELD

The present invention relates to manufacturing methods of a composite material member, a wing structure of an aircraft and a fuselage structure of an aircraft, and a prepreg sheet laminate.

BACKGROUND ART

Japanese Patent Publication (JP-A-Heisei 10-258463) discloses a rib of composite material, which is used in awing of an aircraft. As shown in FIG. 1, a rib 101 includes a web 102 and flanges 103 provided at both ends of the web 102. In order to increase the rigidity of the rib 101, a plurality of beads 104 are provided along the longitudinal direction of the web 102. Each of the beads 104 extends in a direction orthogonal to the longitudinal direction. Since the beads 104 are provided, an actual length $L_{101}$ of the web 102 shown in FIG. 2 is longer than an actual length $L_{102}$ of the flange 103 shown in FIG. 1.

When the rib 101 is molded by using a prepreg material including woven fabric of carbon or glass fiber, wrinkles tend to be generated at corner portions of the bead 104. This is because, since the prepreg material cannot be stretched in the direction of fiber, a difference between the actual length $L_{101}$ and the actual length $L_{102}$ cannot be absorbed.

As shown in FIG. 3, a method is known in which the difference between the actual length $L_{101}$ and the actual length $L_{102}$ is absorbed by forming cuts 106 in a prepreg material 105 at locations corresponding to the corner portions of the beads 104.

CITATION LIST

Patent Literature

Patent literature 1: Japanese Patent Publication (JP-A-Heisei 10-258463)

SUMMARY OF INVENTION

An objective of the present invention is to provide a manufacturing method of a composite material member having less wrinkle, a manufacturing method of a wing structure of an aircraft that includes a composite material member having less wrinkle, a manufacturing method of a fuselage structure of an aircraft that includes a composite material member having less wrinkle, and a prepreg sheet laminate suitable for those manufacturing methods.

In a first aspect of the present invention, a manufacturing method of composite material member includes a step of shaping a laminate including laminated prepreg sheets along a mold. The laminate includes a first layer in which fibers are oriented in single direction. In the first layer, a first surface crossing the single direction and a second surface crossing the single direction are confronted each other such that the first surface and the second surface face each other.

Since the fibers are discontinuous at a cut between the first surface and the second surface, the laminate is easily shaped and wrinkles are hard to be generated in a composite material member to be manufactured from the laminate.

The first layer includes a first point and a second point. Before the step of shaping, the first point and the second point are arranged on a straight line which is parallel to the single direction and crosses the first surface and the second surface at a first intersection and a second intersection such that the first intersection and the second intersection are arranged between the first point and the second point. The step of shaping preferably includes a step of making the laminate to be bent such that a first flange connected to one side of a web and a second flange connected to another side of the web are formed. The first flange and the second flange face each other. The first flange is curved to be convex toward the second flange. After the step of shaping, the first point and the second point are arranged in the web while the first intersection and the second intersection are arranged in the first flange.

The laminate preferably includes a second layer in which fibers are oriented in the single direction, in addition the first layer. In the second layer, a third surface crossing the single direction and a fourth surface crossing the single direction are confronted each other such that the third surface and the fourth surface face each other. The first surface and the third surface are shifted in position from each other along the single direction.

The laminate preferably includes a third layer in which fibers are oriented in a direction which orthogonally crosses the single direction.

In another aspect of the present invention, a manufacturing method of wing structure of aircraft includes a step of manufacturing a spar. The step of manufacturing the spar includes a step of shaping a laminate including laminated prepreg sheets along a mold. The laminate includes a first layer in which fibers are oriented in single direction. In the first layer, a first surface crossing the single direction and a second surface crossing the single direction are confronted each other such that the first surface and the second surface face each other.

In another aspect of the present invention, a manufacturing method of fuselage structure of aircraft includes: a step of manufacturing a frame; and a step of manufacturing a stringer. At least one of the step of manufacturing the frame and the step of manufacturing the stringer includes a step of shaping a laminate including laminated prepreg sheets along a mold. The laminate includes a first layer in which fibers are oriented in single direction. In the first layer, a first surface crossing the single direction and a second surface crossing the single direction are confronted each other such that the first surface and the second surface face each other.

In another aspect of the present invention, a prepreg sheet laminate includes a first layer in which fibers are oriented in a single direction. In the first layer, a first surface crossing the single direction and a second surface crossing the single direction are confronted each other such that the first surface and the second surface face each other.

The prepreg sheet laminate preferably includes a second layer in which fibers are oriented in the single direction, in addition to the first layer. In the second layer, a third surface crossing the single direction and a fourth surface crossing the single direction are confronted each other such that the third surface and the fourth surface face each other. The first surface and the third surface are shifted in position from each other along the single direction.

The prepreg sheet laminate preferably further includes a third layer in which fibers are oriented in a direction which orthogonally crosses the single direction.

According to the present invention, there are provided a manufacturing method of a composite material member having less wrinkle, a manufacturing method of a wing structure of an aircraft that includes a composite material member having less wrinkle, a manufacturing method of a fuselage structure of an aircraft that includes a composite material member having less wrinkle, and a prepreg sheet laminate suitable for those manufacturing methods.

BRIEF DESCRIPTION OF DRAWINGS

The above and other objects, advantages, and features of the present invention will be more apparent from the description of embodiments taken in conjunction with the accompanying drawings, in which.

DESCRIPTION OF EMBODIMENTS

With reference to the accompanying drawings, embodiments of a composite material member, a wing structure of an aircraft, a fuselage structure of an aircraft, manufacturing methods of those and a prepreg sheet laminate according to the present invention will be described below.

First Embodiment

Figure 1:
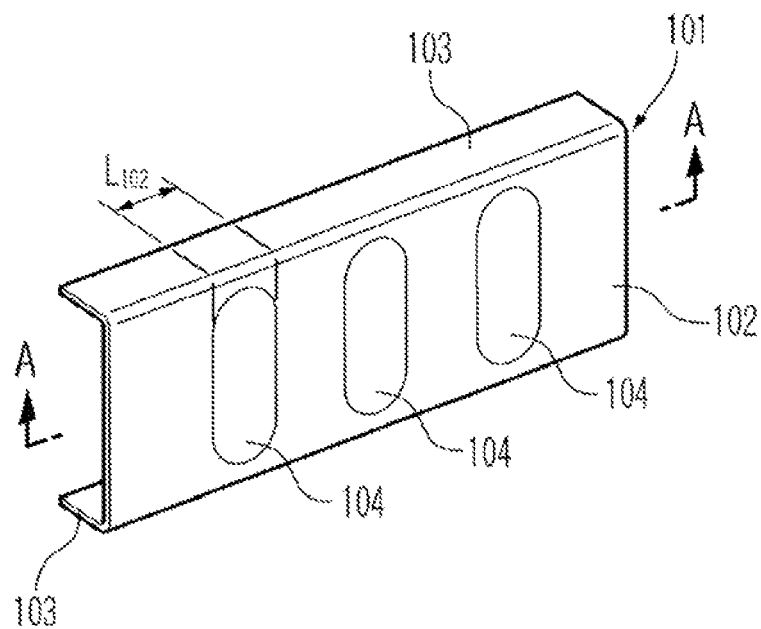
FIG. 1 is a perspective view of a conventional composite material molded product.
Figure 2:
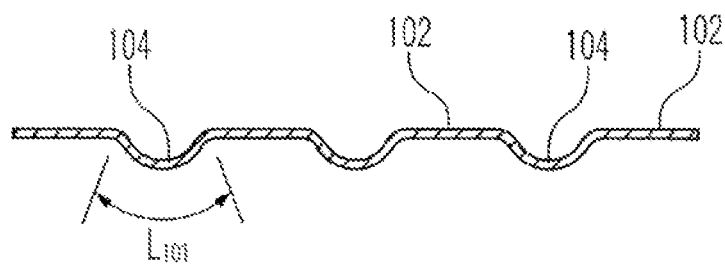
FIG. 2 is a sectional view of the composite material molded product.
Figure 3:
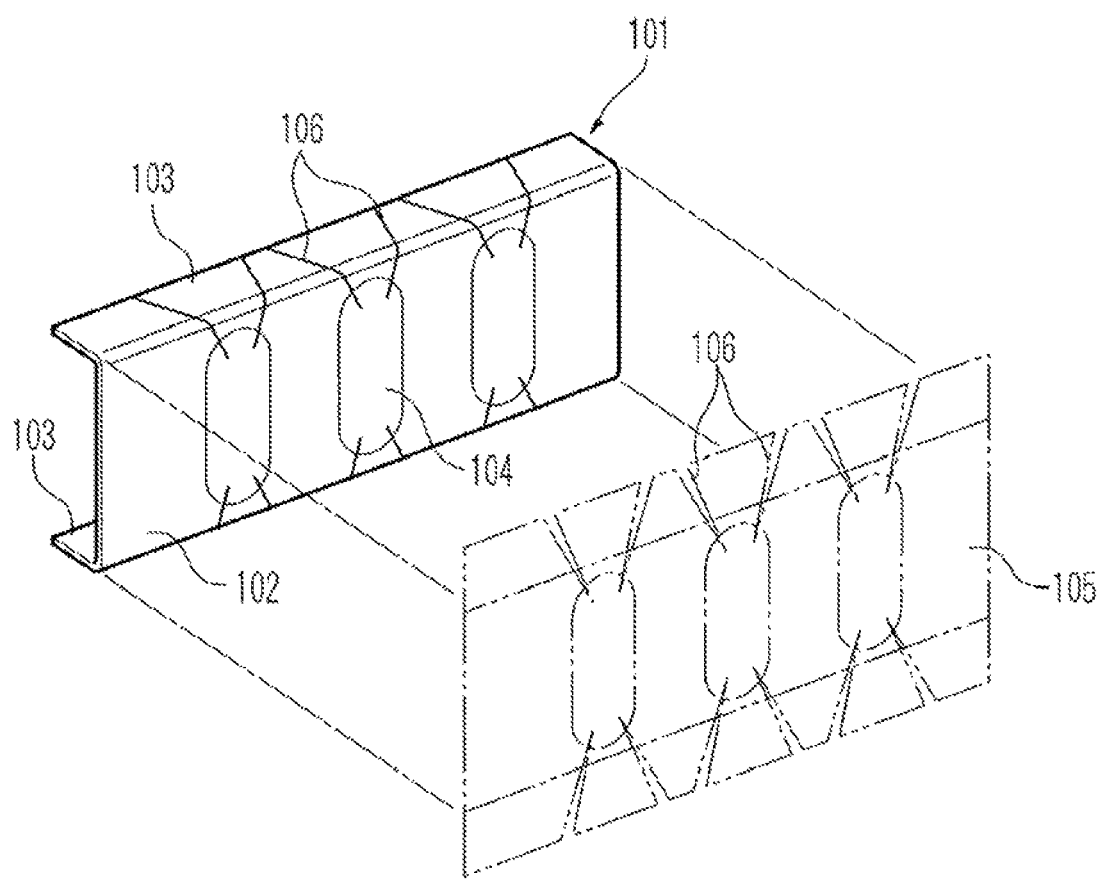
FIG. 3 is a perspective view showing another example of conventional composite material molded product.
Figure 4:
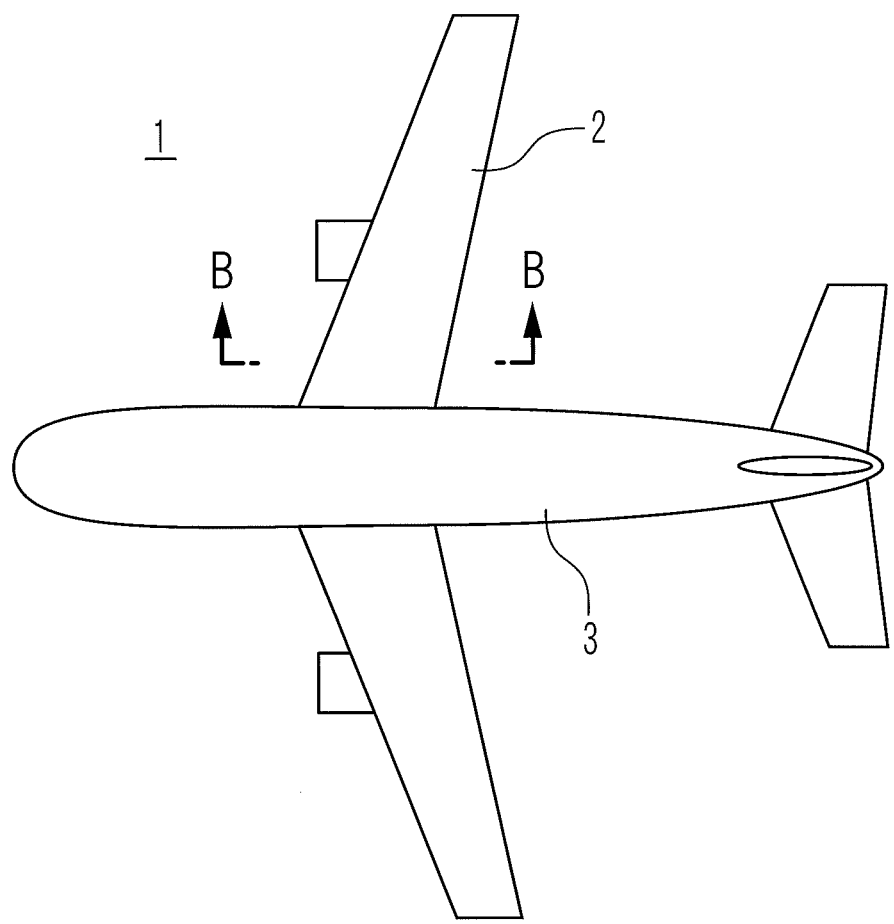
FIG. 4 is a top view of an aircraft according to a first embodiment of the present invention.
Figure 5:
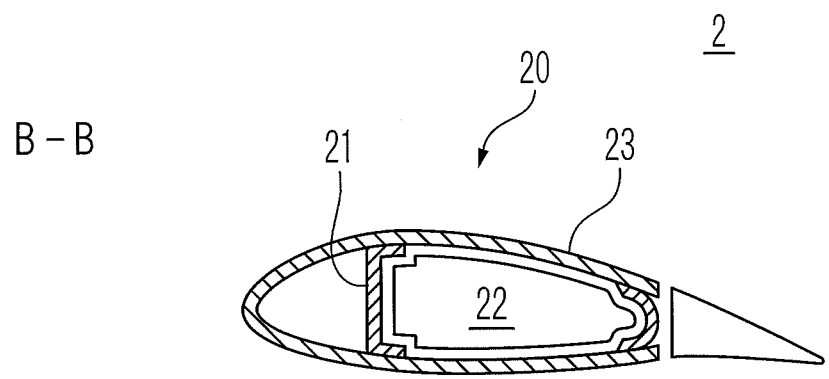
FIG. 5 is a sectional view of a wing structure of the aircraft.

FIG. 4 shows an aircraft 1 according to a first embodiment of the present invention. The aircraft 1 includes a wing 2 and a fuselage 3. FIG. 5 shows a wing structure 20 of the wing 2.

The wing structure 20 includes a spar 21, a rib 22 attached to the spar 21, and a skin 23 attached to the rib 22. The wing 2 may be a main wing or may be a tail assembly.

Figure 6:
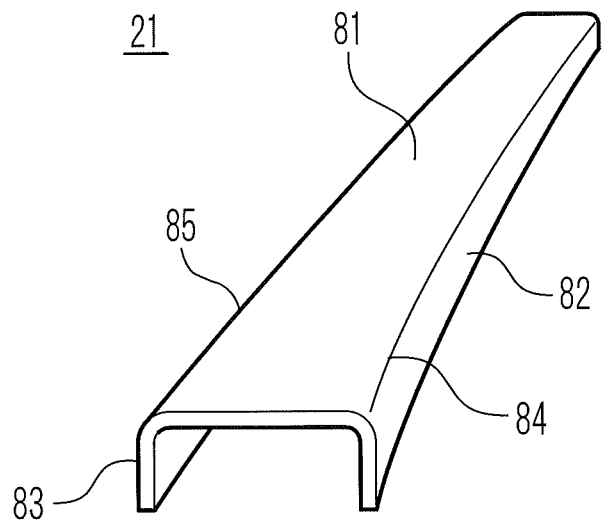
FIG. 6 is a perspective view of a spar of the wing structure.

FIG. 6 shows a perspective view of the spar 21. The spar 21 as a composite material member is formed by composite material such as fiber reinforced plastic. The spar 21 includes a web 81, a flange 82 connected to one side of the web 81, and a flange 83 connected to the other side of the web 81. Each of the web 81, the flange 82 and the flange 83 is plate-shaped. The flange 82 is connected to the web 81 via a corner portion 84 extending along the longitudinal direction of the spar 21. The flange 83 is connected to the web 81 via a corner portion 85 extending along the longitudinal direction of the spar 21. The flange 82 and the flange 83 face each other. The flange 82 is curved to be convex toward the flange 83.

A manufacturing method of the spar 21 will be described below. The manufacturing method of the spar 21 includes: a step of providing a laminate 4 having a shape of a flat plate, in which prepreg sheets are laminated, a step of pre-shaping the laminate 4 along a mold, and a step of curing the pre-shaped laminate 4.

Figure 7:
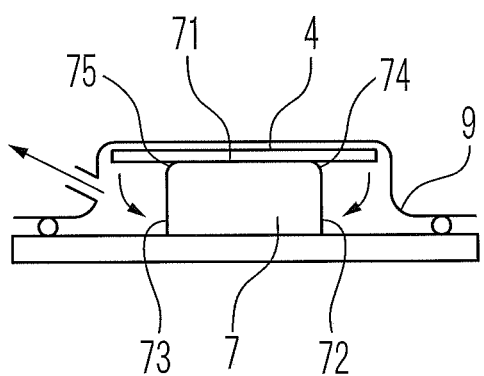
FIG. 7 shows a step of pre-shaping a laminate.

In the pre-shaping step, for example, a hot drape forming is used. FIG. 7 shows a method of pre-shaping the laminate 4 by using the hot drape forming. A shaping mold 7 has a top surface 71, a side surface 72 connected to the top surface 71 via a corner portion 74, and a side surface 73 connected to the top surface 71 via a corner portion 75. The top surface 71 corresponds to the web 81, the side surface 72 corresponds to the flange 82, the side surface 73 corresponds to the flange 83, the corner portion 74 corresponds to the corner portion 84, and the corner portion 75 corresponds to the corner portion 85. The laminate 4 is placed on the top surface 71 and positioned with respect to the shaping mold 7.

Figure 8:
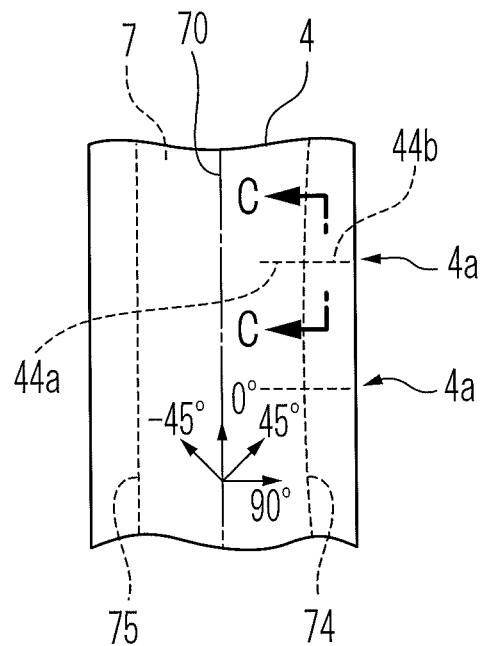
FIG. 8 is a top view showing an arrangement between the laminate according to the first embodiment and a shaping mold.

FIG. 8 shows the arrangement between the laminate 4 and the shaping mold 7. A center line 70 of the shaping mold 7 is a straight line. The distance from the corner portion 74 to the center line 70 is approximately equal to the distance from the corner portion 75 to the center line 70. Correspondingly to the point that the flange 82 is curved to be convex toward the flange 83, the corner portion 74 is curved to be convex toward the corner portion 75. The laminate 4 includes a 0 degree layer, a +45 degree layer, a −45 degree layer and a 90 degree layer. In each of the 0 degree layer, the +45 degree layer, the −45 degree layer and the 90 degree layer, fibers are oriented in single direction (unidirectionally oriented). A direction of the fibers in the 0 degree layer (0 degree direction), a direction of the fibers in the +45 degree layer (+45 degree direction), a direction of the fibers in the −45 degree layer (−45 degree direction) and a direction of the fibers in the 90 degree layer (90 degree direction) are indicated by arrows in the figure. The +45 degree direction obliquely crosses the 0 degree direction at the angle of +45 degree. The −45 degree direction obliquely crosses the 0 degree direction at the angle of −45 degree. The 90 degree direction crosses the 0 degree direction at the angle of 90 degree. For example, the laminate 4 is positioned with respect to the shaping mold 7 such that the angle between the 0 degree direction and the center line 70 is in a range from −10 degree to +10 degree.

The 0 degree layer is provided with cuts 4a such that when the laminate 4 is positioned with respect to the shaping mold 7, the cuts 4a cross the corner portion 74 as viewed in a direction orthogonal to the top surface 71. The cuts 4a cross the 0 degree direction.

Figure 9:
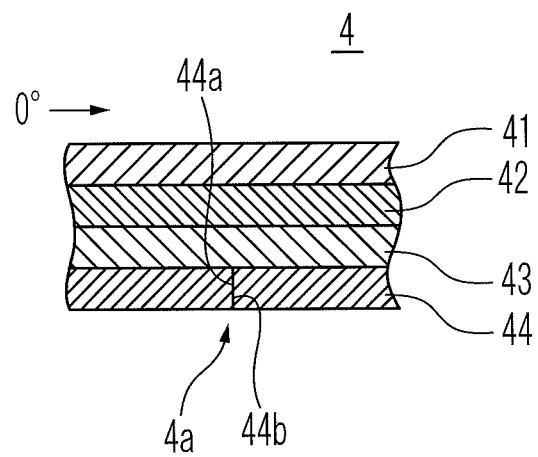
FIG. 9 is a sectional view of the laminate of FIG. 8.

FIG. 9 shows a sectional view along the C-C cutting line of FIG. 8. The laminate 4 includes a prepreg sheet 41 as the +45 degree layer, a prepreg sheet 42 as the 90 degree layer, a prepreg sheet 43 as the −45 degree layer, and a prepreg sheet 44 as the 0 degree layer. The prepreg sheet 44 is arranged at a side near the top surface 71, and the prepreg sheet 41 is arranged at a side far from the top surface 71. The prepreg sheet 42 is arranged between the prepreg sheet 41 and the prepreg sheet 43, and the prepreg sheet 43 is arranged between the prepreg sheet 42 and the prepreg sheet 44. The cuts 4a are provided in the prepreg sheet 44. The prepreg sheet 44 includes fibers which are discontinuous at the cut 4a. The prepreg sheet 44 has a surface 44a and a surface 44b at each cut 4a. The cut 4a is formed between the surface 44a and the surface 44b. Each of the surface 44a and the surface 44b crosses, for example, the 0 degree direction at the angle of 90 degree or approximate 90 degree. The approximate 90 degree is an angle in a range from 87 degree to 93 degree. The surface 44a and the surface 44b are confronted each other such that the surfaces face each other. At each of the surface 44a and the surface 44b, cut surfaces of a plurality of fibers are arranged. The cut surfaces correspond to transverse sections of the fibers. A cut like the cut 4a is not provided in the prepreg sheets 41, 42 and 43.

Figure 10:
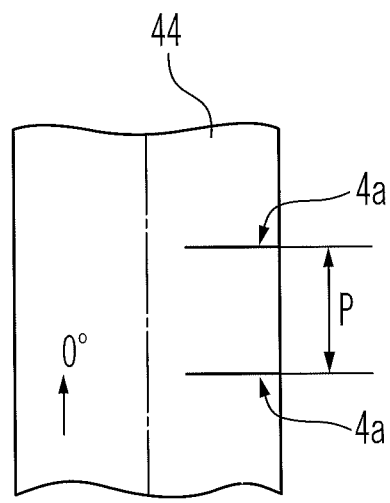
FIG. 10 is a top view of a 0 degree layer prepreg sheet of the laminate according to the first embodiment.

With reference to FIG. 10, when a plurality of cuts 4a are provided to the prepreg sheet 44, the cuts 4a are provided at a pitch P along the 0 degree direction. Only single cut 4a may be provided.

Figure 11:
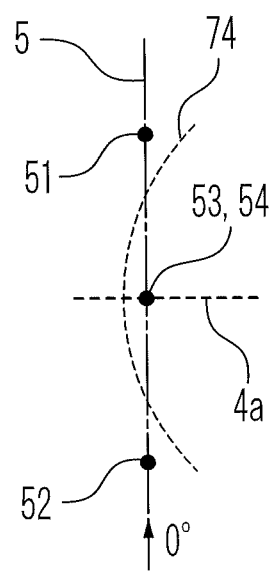
FIG. 11 is a top view showing a detailed arrangement between the laminate and the shaping mold.

With reference to FIG. 11, the arrangement between the shaping mold 7 and the laminate 4 shown in FIG. 8 will be described in detail. The prepreg sheet 44 includes a straight line 5 parallel to the 0 degree direction. There are a point 51, a point 52, an intersection 53 and an intersection 54 on the straight line 5. The intersection 53 is an intersection between the straight line 5 and the surface 44a, and the intersection 54 is an intersection between the straight line 5 and the surface 44b. The intersection 53 and the intersection 54 are arranged between the point 51 and the point 52. The points 51, 52 and the intersections 53, 54 are arranged at both sides of the corner portion 74, respectively.

Figure 12:
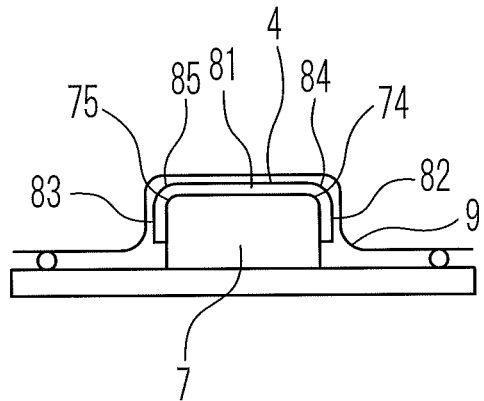
FIG. 12 shows the pre-shaped laminate.

With reference to FIG. 7, after the laminate 4 and the shaping mold 7 are covered with a film 9, the inside of the film 9 is vacuumed while heating the laminate 4. As a result, the laminate 4 is made to be bent along the corner portion 74 and the corner portion 75. Consequently, the web 81, the flange 82, the flange 83, the corner portion 84 and the corner portion 85 are formed as shown in FIG. 12.

A portion of the laminate 4, which is to be the flange 82, is made to be curved to form the flange 82. At this time, tension along the straight line 5 is applied to the portion to be the flange 82. Since the fibers arranged on the straight line 5 are discontinuous at the cut 4a, the laminate 4 is easily shaped along the shaping mold 7 and wrinkles are hard to be generated in the laminate 4.

Next, in the curing step, an autoclave is used to perform a curing process on the pre-shaped laminate 4 under a heated and pressurized condition.

Figure 13:
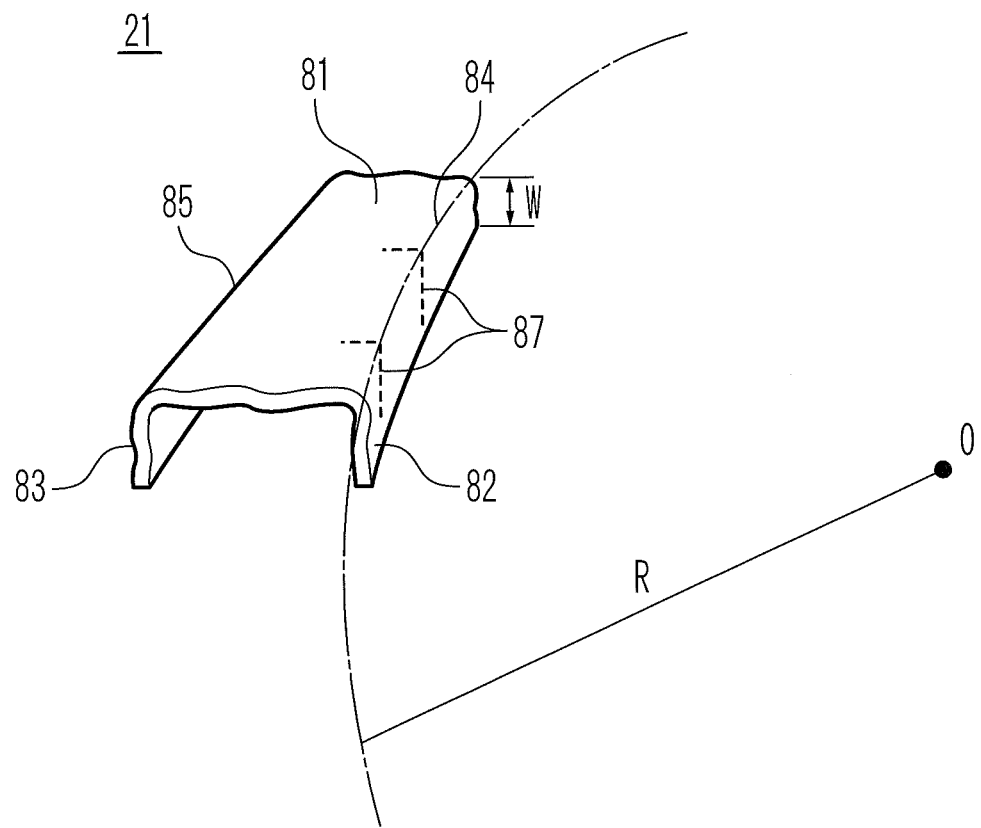
FIG. 13 is a perspective view of a spar according to the first embodiment.

FIG. 13 shows a spar 21 that is manufactured through the above-described pre-shaping step and curing step from the laminate 4. Since the cuts 4a are provided to the laminate 4, wrinkles are prevented to be generated in the spar 21. The spar 21 includes boundary planes 87 corresponding to the respective cuts 4a. At the boundary plane 87, a plurality of fibers in the prepreg sheet 44 are discontinuous. The boundary plane 87 crosses the corner portion 84 to be arranged in both of the flange 82 and the web 81. The point 51 and the point 52 are arranged in the web 81. The intersection 53 and the intersection 54 are arranged in the flange 82.

When a radius of curvature, R of the flange 82 is from 50000 mm to 75000 mm and a width W of the flange 82 is 150 mm or less, the pitch P of 300 mm remarkably suppresses the generation of wrinkles. As the curvature radius R is smaller or the necessary width of the flange is larger, the pitch P is preferred to be smaller. However, the curvature radius R, the width W and the pitch P are not limited to those values.

After the curing, the fibers in the +45 degree layer and the fibers in the −45 degree layer resist the tension parallel to the 0 degree direction. Thus, it is prevented that the spar 21 cannot achieve a desired strength due to the existence of the boundary planes 87.

COMPARISON EXAMPLE

Figure 14:
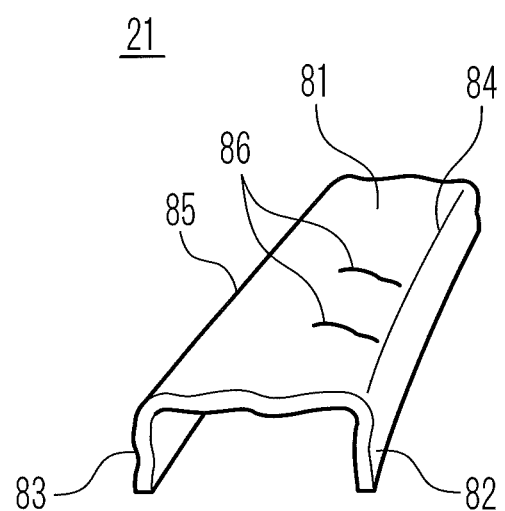
FIG. 14 is a perspective view of a spar according to a comparison example.

The above-described cuts 4a are not provided to a laminate 4 according to a comparison example of the present invention. FIG. 14 shows a spar 21 that is manufactured through the above-described pre-shaping step and curing step from the laminate 4 according to the comparison example. When a portion of the laminate 4, which is to be the flange 82, is made to be curved to form the flange 82, tension is applied to the portion to be flange 82 along the fibers in the 0 degree layer. Since the fibers in the 0 degree layer resist the tension, as shown in FIG. 14, wrinkles 86 are generated in the web 81. Since the wrinkles 86 deteriorate the strength of the spar 21, the number of the wrinkles 86 is preferred to be small.

Second Embodiment

Figure 15:
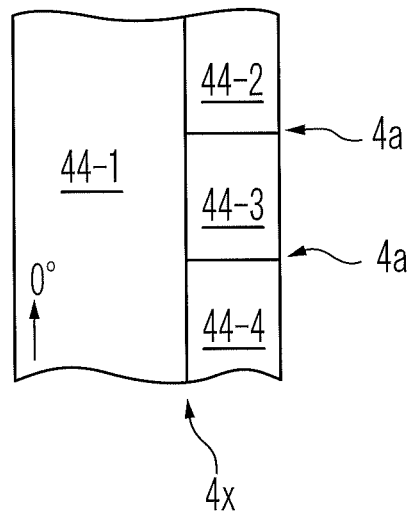
FIG. 15 is a top view of a 0 degree layer prepreg sheet of a laminate according to a second embodiment of the present invention.
Figure 16:
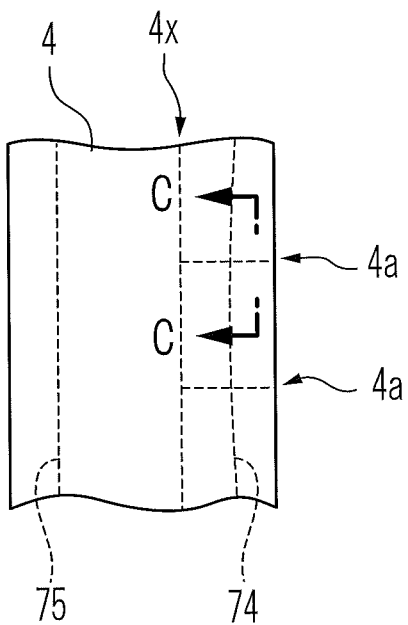
FIG. 16 is a top view showing an arrangement between the laminate according to the second embodiment and the shaping mold.

A laminate 4 according to a second embodiment of the present invention is different from the laminate 4 according to the first embodiment, only in the 0 degree layer. With reference to FIG. 15, the 0 degree layer according to the second embodiment corresponds to the prepreg sheet 44 according to the first embodiment to which a cut 4x parallel to the 0 degree direction is added. In this case, the 0 degree layer of the laminate 4 includes a prepreg sheet 44-1, a prepreg sheet 44-2, a prepreg sheet 44-3 and a prepreg sheet 44-4. With reference to FIG. 16, the cut 4x is arranged between the corner portion 74 and the corner portion 75 as viewed in a direction orthogonal to the top surface 71. Since the cut 4x disappears when the resin of the prepreg sheet is melted and re-solidified, there is no boundary plane corresponding to the cut 4x in a spar that is manufactured through the above-mentioned pre-shaping step and curing step from the laminate 4 according to the present embodiment. The method according to the present embodiment is effective, for example, when a laminate in which the width of web is wide is manufactured. That is, the method according to the present embodiment has an advantage of easy manufacturing as compared to a method in which a web and flanges are formed by using single large prepreg sheet with cuts. Also, the method has a merit of improving material utilization.

Third Embodiment

Figure 17:
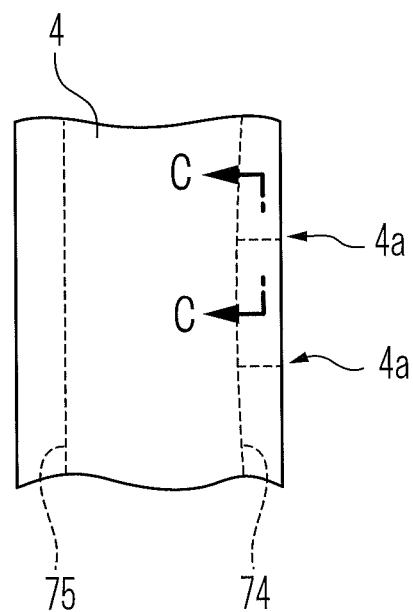
FIG. 17 is a top view showing an arrangement between a laminate according to a third embodiment of the present invention and the shaping mold.
Figure 18:
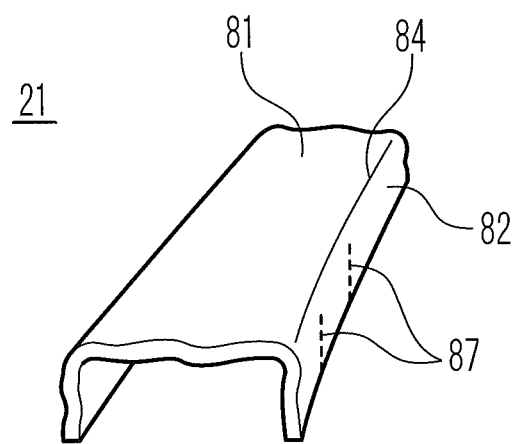
FIG. 18 is a perspective view of a spar according to the third embodiment.

With reference to FIG. 17, a laminate 4 according to a third embodiment of the present invention is different from the laminate 4 according to the first embodiment of the present invention, only in a point that the cuts 4a do not cross the corner portion 74. FIG. 18 shows a spar that is manufactured through the above-mentioned pre-shaping step and curing step from the laminate 4 in FIG. 17. As shown in FIG. 18, the boundary planes 87 corresponding to the cuts 4a are arranged in only the flange 82 and not arranged in the web 81. A method according to the present embodiment is effective when the curvature radius of the flange of the member exceeds 5000 mm and cut of fibers are desired to be suppressed to the minimum in order to retain the strength of the member at the maximum.

Fourth Embodiment

Figure 19:
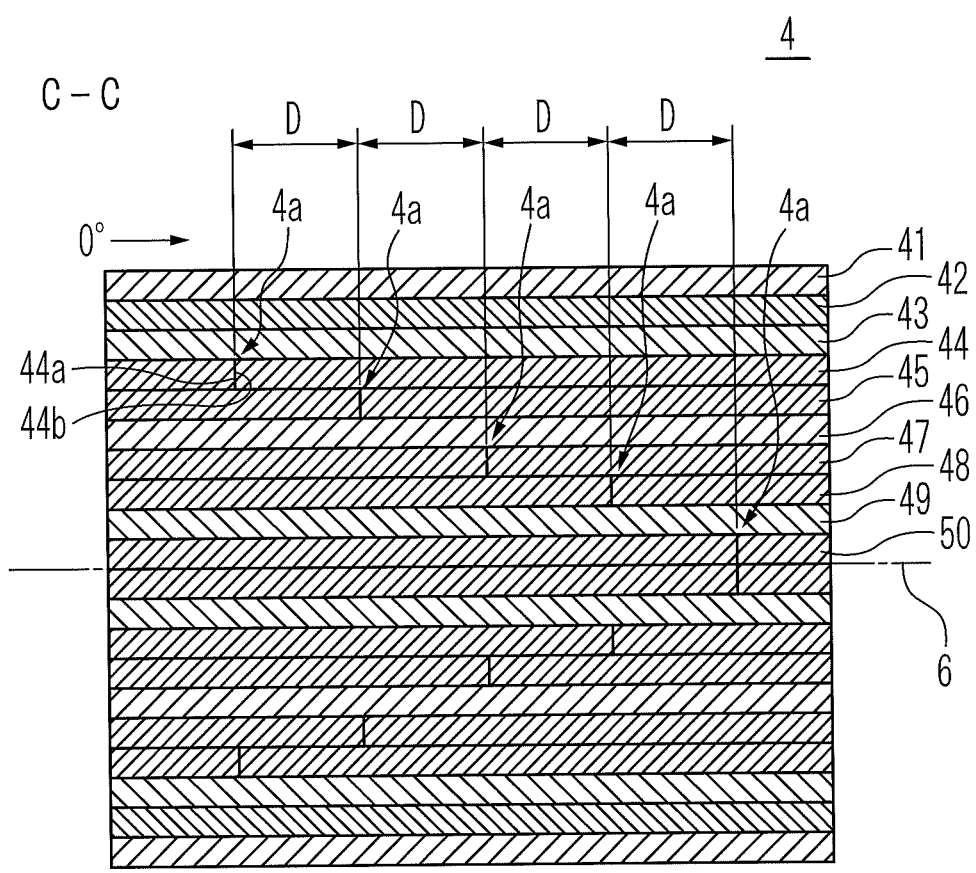
FIG. 19 is a sectional view of a laminate according to a fourth embodiment of the present invention.

A laminate 4 according to a fourth embodiment of the present invention corresponds to the laminate 4 according to any of the first to third embodiments, to which other layers are added. With reference to FIG. 19, the laminate 4 according to the present embodiment is mirror-symmetrical with respect to a plane of symmetry, 6. The laminate 4 includes a prepreg sheet 45 as a 0 degree layer, a prepreg sheet 46 as a +45 degree layer, a prepreg sheet 47 and a prepreg sheet 48 as 0 degree layers, a prepreg sheet 49 as a −45 degree layer, and a prepreg sheet 50 as a 0 degree layer, in addition to the above-mentioned prepreg sheets 41 to 44. The prepreg sheet 44 is arranged between the prepreg sheet 41 and the symmetry plane 6. The prepreg sheet 47 is arranged between the prepreg sheet 44 and the symmetry plane 6. The prepreg sheet 45 is arranged between the prepreg sheet 44 and the prepreg sheet 47. The prepreg sheet 46 is arranged between the prepreg sheet 45 and the prepreg sheet 47. The prepreg sheet 49 is arranged between the prepreg sheet 47 and the symmetry plane 6. The prepreg sheet 48 is arranged between the prepreg sheet 47 and the prepreg sheet 49. The prepreg sheet 50 is arranged between the prepreg sheet 49 and the symmetry plane 6.

The prepreg sheet 45 is provided with a cut 4a at a position shifted by a distance D in the 0 degree direction from the cut 4a in the prepreg sheet 44. The prepreg sheet 47 is provided with a cut 4a at a position shifted by the distance D in the 0 degree direction from the cut 4a in the prepreg sheet 45. The prepreg sheet 48 is provided with a cut 4a at a position shifted by the distance D in the 0 degree direction from the cut 4a in the prepreg sheet 47. The prepreg sheet 50 is provided with a cut 4a at a position shifted by the distance D in the 0 degree direction from the cut 4a in the prepreg sheet 48. The respective cuts 4a are provided to cross the 0 degree direction. In the cut 4a of each of the prepreg sheet 45, the prepreg sheet 47, the prepreg sheet 48 and the prepreg sheet 50, a surface like the surface 44a and a surface like the surface 44b are confronted each other such that the surfaces face each other. The distance D is preferred to be 25 mm (1 inch) or longer. The above-mentioned shifts are intentionally provided. The distance D may be determined such that the cuts 4a of the prepreg sheets 45, 47, 48 and 50 are uniformly dispersed in the entire of the pitch of the cuts 4a in the prepreg sheet 44, or the distance D may be determined such that the cuts 4a of the prepreg sheets 44, 45, 47, 48 and 50 are uniformly dispersed in the entire of the laminate 4.

A spar 21 is manufactured through the above-described pre-shaping step and curing step from the laminate 4 shown in FIG. 19. Since the spar 21 includes the plurality of 0 degree layers and boundary planes 87 formed in those layer are shifted in the 0 degree direction, the strength of the spar 21 is enhanced.

In the above-mentioned respective embodiments, a +θ degree layer may be used in place of the +45 degree layer, and a −θ degree layer may be used in place of the −45 degree layer. In each of the +θ degree layer and the −θ degree layer, fibers are oriented in single direction. The direction of fibers in the +θ degree layer obliquely crosses the 0 degree direction at the angle of +θ degree. The direction of the fibers in the −θ degree layer obliquely crosses the 0 degree direction at the angle of −θ degree. Here, 0<θ<45, or 45<θ<90.

Figure 20:
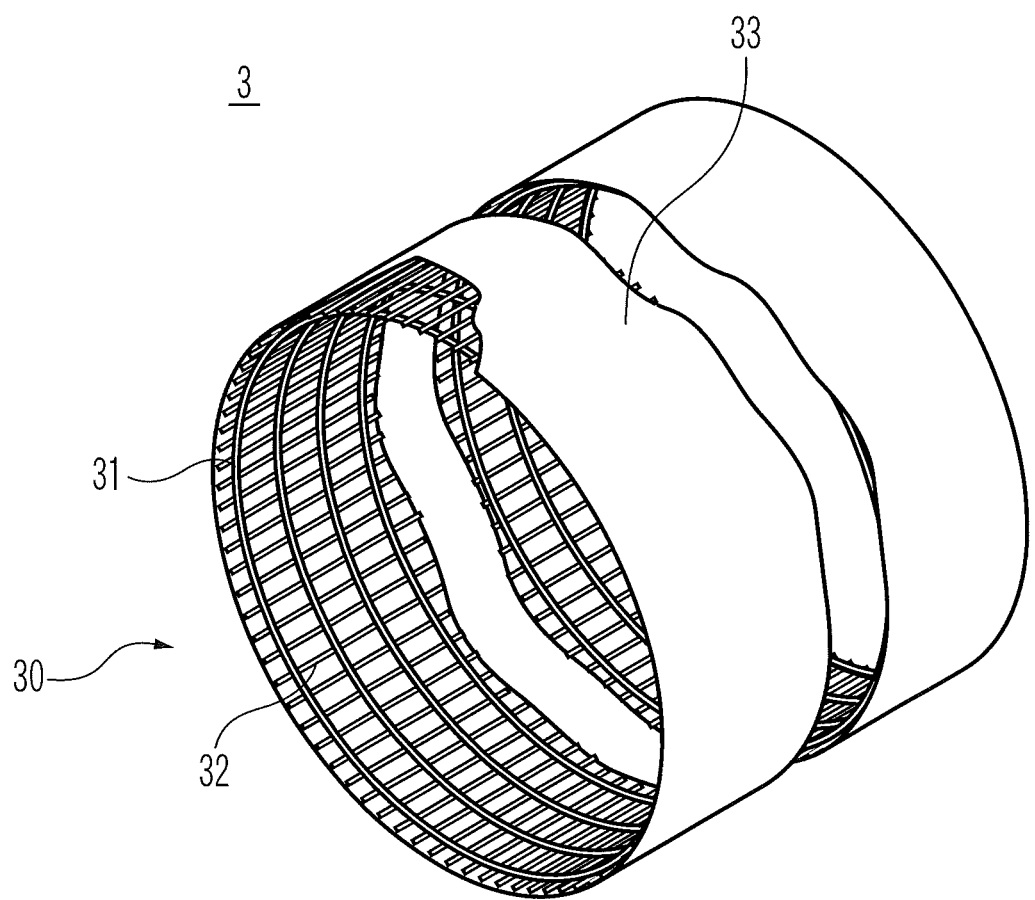
FIG. 20 is a perspective view of a fuselage structure of the aircraft.
Figure 21:
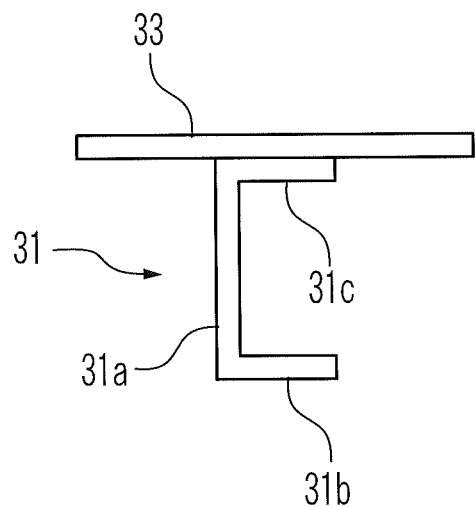
FIG. 21 is a sectional view of a frame of the fuselage structure.
Figure 22:
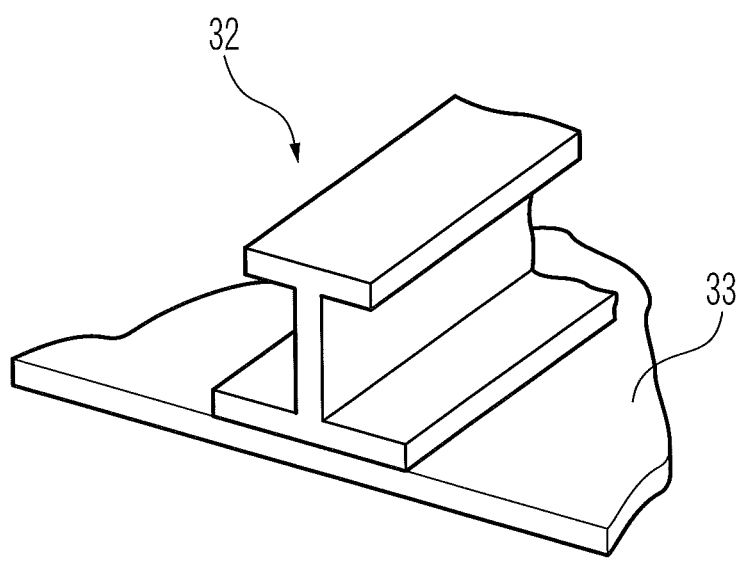
FIG. 22 is a perspective view of a stringer of the fuselage structure.
Figure 23:
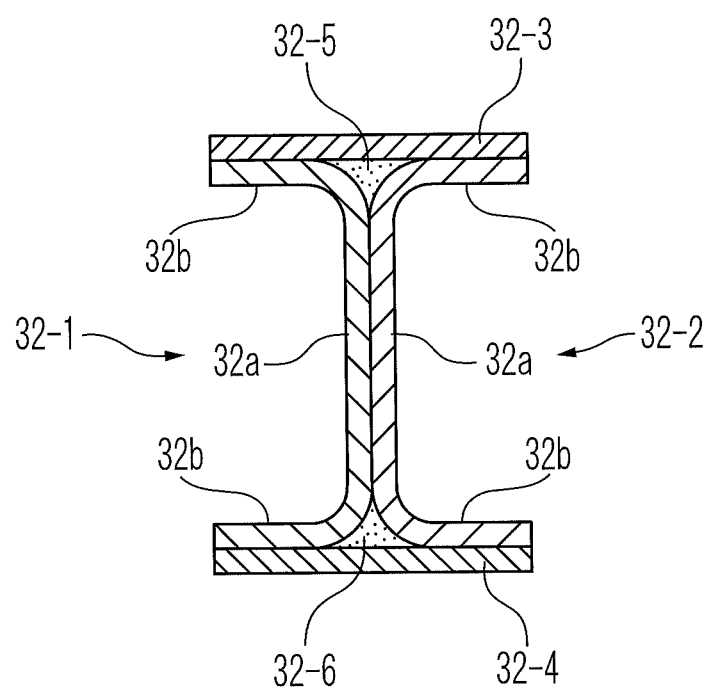
FIG. 23 is a sectional view of the stringer.

The manufacturing methods according to the above-mentioned embodiments can be used to manufacture a frame 31 and a stringer 32 as composite material members. With reference to FIG. 20, a fuselage structure 30 of the fuselage 3 includes the frame 31 which is ring-shaped, the stringer 32 which is fixed to the frame 31, and a skin 33. As shown in FIG. 21, the frame 31 includes a web 31a and flanges 31b and 31c which are connected to the web 31a. The web 31a corresponds to the web 81, the flange 31b corresponds to the flange 82, and the flange 31c corresponds to the flange 83. As shown in FIG. 22, the stringer 32 is H-shaped or I-shaped in the transverse section. As shown in FIG. 23, the stringer 32 includes members 32-1 and 32-2, a top plate 32-3 having a flat-plate shape, a base plate 32-4 having a flat-plate shape, and corner portion fillers 32-5 and 32-6. Each of the members 32-1 and 32-2 is U-shaped or right U-shaped in the transverse section. Each of the members 32-1 and 32-2 includes a web 32a and two flanges 32b connected to the web 32a. The web 32a of the member 32-1 and the web 32a of the member 32-2 are coupled to each other such that the members 32-1 and 32-2 form a coupled body which is H-shaped or I-shaped in the transverse section. The top plate 32-3 and the base plate 32-4 face each other with the coupled body being arranged between them. The top plate 32-3 is coupled to the flanges 32b of the members 32-1 and 32-2, which are arranged on a side far from the skin 33. The corner portion filler 32-5 is arranged to be surrounded by the top plate 32-3, the member 32-1 and the member 32-2. The base plate 32-4 is coupled to the flanges 32b of the members 32-1 and 32-2, which are arranged on a side near the skin 33. The corner portion filler 32-6 is arranged to be surrounded by the base plate 32-4, the member 32-1 and the member 32-2. The base plate 32-4 is coupled to the skin 33. With respect to each of the members 32-1 and 32-2, the web 32a corresponds to the web 81, and the two flanges 32b correspond to the flange 82 and the flange 83.

The present invention has been described with reference to the embodiments; however, the present invention is not limited to the above embodiments. Various modifications can be applied to the above embodiments. For example, the above embodiments can be combined with each other.

The invention claimed is:
1. A manufacturing method of a composite material member comprising shaping a laminate including laminated prepreg sheets along a mold,
wherein the laminate includes a first layer in which fibers are oriented in a single direction,
wherein, in the first layer, a first surface crossing the single direction and a second surface crossing the single direction confront each other such that the first surface and the second surface face each other,
wherein the first layer includes a first point and a second point,
wherein, before said shaping, the first point and the second point are arranged on a straight line which is parallel to the single direction and crosses the first surface and the second surface at a first intersection and a second intersection such that the first intersection and the second intersection are arranged between the first point and the second point,
wherein said shaping includes making the laminate to be bent such that a first flange connected to one side of a web and a second flange connected to another side of the web are formed,
wherein the first flange and the second flange face each other, and the first flange is curved to be convex toward the second flange, and wherein, after said shaping, the first point and the second point are arranged in the web while the first intersection and the second intersection are arranged in the first flange.

2. The manufacturing method of a composite material member according to claim 1, wherein the laminate includes a second layer in which fibers are oriented in the single direction, wherein, in the second layer, a third surface crossing the single direction and a fourth surface crossing the single direction confront each other such that the third surface and the fourth surface face each other, and wherein the first surface and the third surface are shifted in position from each other along the single direction.

3. The manufacturing method of a composite material member according to claim 1, wherein the laminate includes a third layer in which fibers are oriented in a direction which orthogonally crosses the single direction.

4. A manufacturing method of a wing structure of an aircraft comprising manufacturing a spar, wherein said manufacturing said of the spar includes shaping a laminate including laminated prepreg sheets along a mold, wherein the laminate includes a first layer in which fibers are oriented in a single direction, and wherein, in the first layer, a first surface crossing the single direction and a second surface crossing the single direction confront each other such that the first surface and the second surface face each other, wherein the first layer includes a first point and a second point, wherein, before said shaping, the first point and the second point are arranged on a straight line which is parallel to the single direction and crosses the first surface and the second surface at a first intersection and a second intersection such that the first intersection and the second intersection are arranged between the first point and the second point, wherein said shaping includes making the laminate to be bent such that a first flange connected to one side of a web and a second flange connected to another side of the web are formed, wherein the first flange and the second flange face each other, and the first flange is curved to be convex toward the second flange, and wherein, after said shaping, the first point and the second point are arranged in the web while the first intersection and the second intersection are arranged in the first flange.

5. A manufacturing method of a fuselage structure of an aircraft comprising:

manufacturing a frame; and manufacturing a stringer, wherein at least one of said manufacturing of the frame and said manufacturing of the stringer includes shaping a laminate including laminated prepreg sheets along a mold, wherein, the laminate includes a first layer in which fibers are oriented in a single direction, wherein, in the first layer, a first surface crossing the single direction and a second surface crossing the single direction confront each other such that the first surface and the second surface face each other, wherein the first layer includes a first point and a second point, wherein, before said shaping, the first point and the second point are arranged on a straight line which is parallel to the single direction and crosses the first surface and the second surface at a first intersection and a second intersection such that the first intersection and the second intersection are arranged between the first point and the second point, wherein said shaping includes making the laminate to be bent such that a first flange connected to one side of a web and a second flange connected to another side of the web are formed, wherein the first flange and the second flange face each other, and the first flange is curved to be convex toward the second flange, and wherein, after said shaping, the first point and the second point are arranged in the web while the first intersection and the second intersection are arranged in the first flange.

* * * * *